(12) United States Patent
Bai et al.

(10) Patent No.: US 12,505,869 B2
(45) Date of Patent: Dec. 23, 2025

(54) MEMORY DEVICES, OPERATION METHODS THEREOF, AND MEMORY SYSTEMS

(71) Applicant: Yangtze Memory Technologies Co., Ltd., Hubei (CN)

(72) Inventors: Guangyu Bai, Hubei (CN); Li Xiang, Hubei (CN); Ke Liang, Hubei (CN); Dejun Li, Hubei (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 71 days.

(21) Appl. No.: 18/409,430

(22) Filed: Jan. 10, 2024

(65) Prior Publication Data
US 2025/0131950 A1    Apr. 24, 2025

(30) Foreign Application Priority Data
Oct. 24, 2023    (CN) .......................... 202311388831.6

(51) Int. Cl.
| | | |
|---|---|---|
| *G11C 7/10* | (2006.01) | |
| *G11C 8/08* | (2006.01) | |
| *G11C 8/10* | (2006.01) | |
| G11C 11/56 | (2006.01) | |
| G11C 16/04 | (2006.01) | |
| G11C 16/08 | (2006.01) | |
| G11C 16/26 | (2006.01) | |

(52) U.S. Cl.
CPC .......... *G11C 7/1063* (2013.01); *G11C 7/1057* (2013.01); *G11C 8/08* (2013.01); *G11C 8/10* (2013.01); G11C 11/5642 (2013.01); G11C 16/0483 (2013.01); G11C 16/08 (2013.01); G11C 16/26 (2013.01)

(58) Field of Classification Search
CPC . G11C 11/5642; G11C 16/0483; G11C 16/08; G11C 16/26; G11C 7/1057; G11C 7/1063; G11C 8/08; G11C 8/10
USPC ........................................................ 365/191
See application file for complete search history.

(56) References Cited

U.S. PATENT DOCUMENTS

| | | | | |
|---|---|---|---|---|
| 5,825,205 A | * | 10/1998 | Ohtsuka ................. | G11C 16/12 365/230.06 |
| 2001/0036108 A1 | * | 11/2001 | Takano .................. | G11C 16/08 365/185.18 |

(Continued)

*Primary Examiner* — Ly D Pham
(74) *Attorney, Agent, or Firm* — Hanley, Flight & Zimmerman, LLC

(57) ABSTRACT

A memory device includes a peripheral circuit and a memory array coupled with the peripheral circuit. The memory array includes at least one memory block. The peripheral circuit includes at least one row decoder. One memory block is correspondingly connected with one row decoder. The row decoder includes a logic circuit and a level conversion circuit. The logic circuit is configured to generate a first control signal, a second control signal, and a first output signal based on an address signal and a status signal of the memory block correspondingly connected with the row decoder. A level of the second control signal is higher than a level of the first control signal. The level conversion circuit is configured to generate a second output signal based on the first output signal in response to the first control signal and the second control signal respectively.

20 Claims, 9 Drawing Sheets

(56) References Cited

U.S. PATENT DOCUMENTS

2007/0047365 A1* 3/2007 Yoshinaga .............. G11C 5/147
  365/226
2010/0302894 A1* 12/2010 Takahashi .......... G11C 13/0028
  365/230.06

* cited by examiner

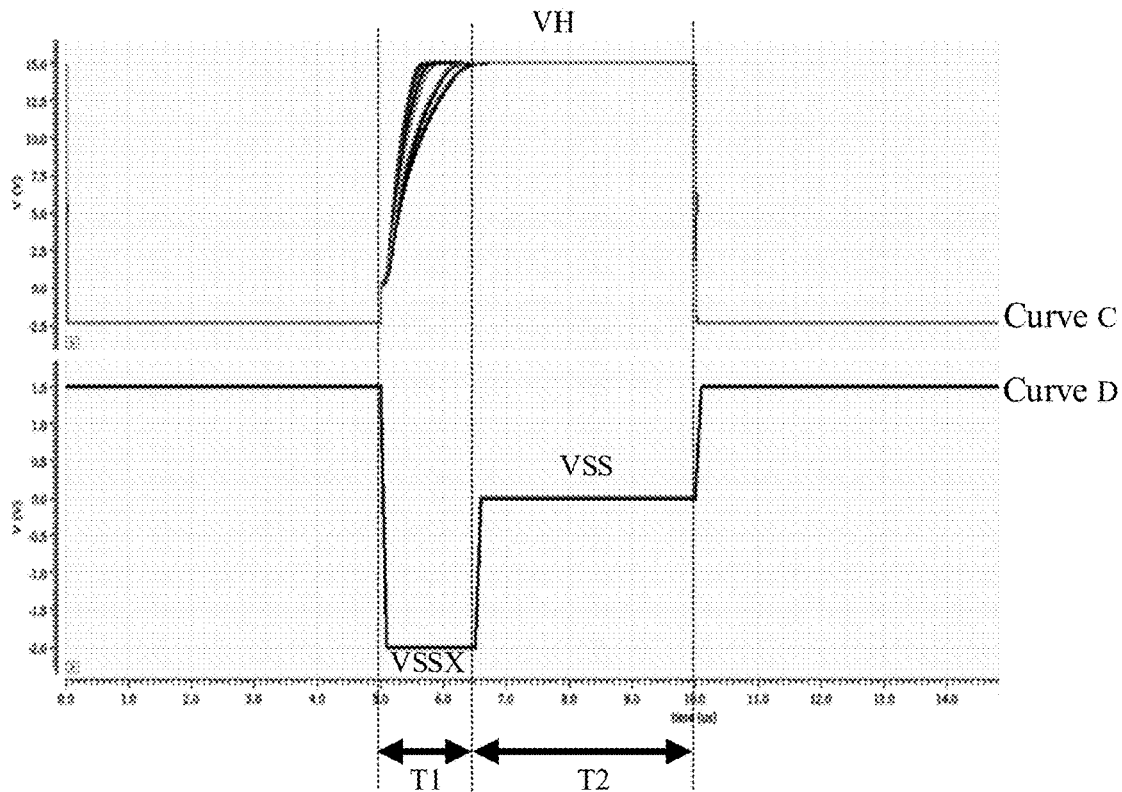

FIG. 16

A logical circuit in a row decoder of a memory device generates a first control signal, a second control signal, and a first output signal based on an address signal and a status signal of a memory block correspondingly connected with the row decoder, wherein a level of the second control signal is higher than a level of the first control signal — S10

A level conversion circuit in the row decoder generates a second output signal based on the first output signal in response to the first control signal and the second control signal respectively — S20

FIG. 17

MEMORY DEVICES, OPERATION METHODS THEREOF, AND MEMORY SYSTEMS

CROSS REFERENCE TO RELATED APPLICATION

This application claims priority to and the benefit of Chinese Patent Application 202311388831.6, filed on Oct. 24, 2023, which is hereby incorporated by reference in its entirety.

TECHNICAL FIELD

The present disclosure relates to the technical field of semiconductors, and particularly to a memory device, an operation method thereof, and a memory system.

BACKGROUND

A memory device is a memory apparatus configured to store information in modern information technologies. As a typical nonvolatile semiconductor memory, a NAND (Not-And) flash memory has become a mainstream product in the storage market due to a relatively high storage density, controllable production costs, appropriate program and erase speeds, and a retention characteristic.

BRIEF DESCRIPTION OF THE DRAWINGS

FIG. 16 is a diagram 2 of a simulation result of a row decoder provided by examples of the present disclosure; and FIG. 17 is a schematic flowchart of an operation method of a memory device provided by examples of the present disclosure.

DETAILED DESCRIPTION

Figure 1:
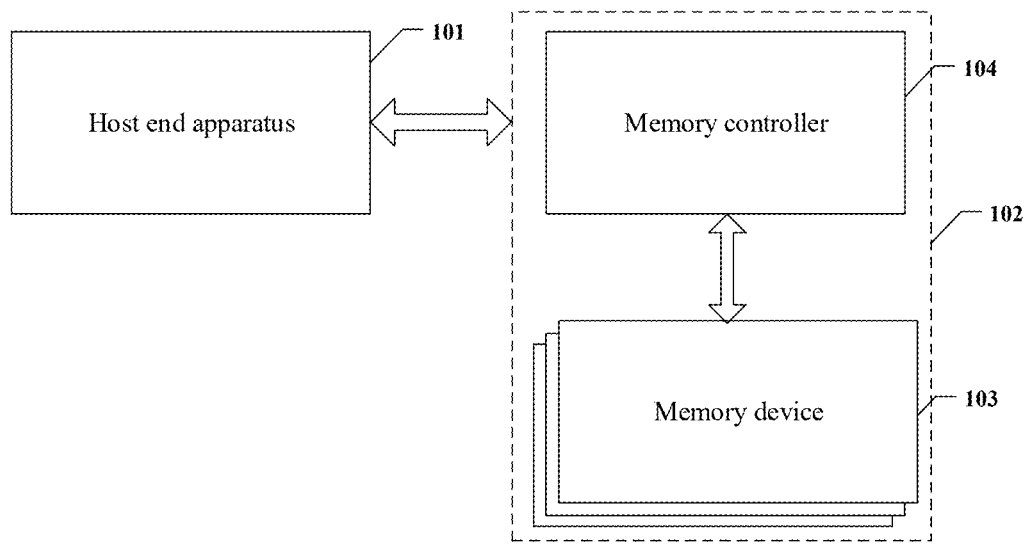
FIG. 1 is a schematic diagram of an example system having a memory system provided by examples of the present disclosure.

Example implementations disclosed by the present disclosure will be described below in more details with reference to the drawings. Although example implementations of the present disclosure are shown in the figures, it is to be understood that, the present disclosure may be implemented by any form without being limited by the example implementations as set forth herein. Rather, these implementations are provided for a more thorough understanding of the present disclosure, and can fully convey the scope disclosed by the present disclosure to those skilled in the art.

In the following description, numerous example details are presented to provide a more thorough understanding of the present disclosure. However, it is apparent to those skilled in the art that the present disclosure may be practiced without one or more of these details. In other examples, in order to avoid confusing with the present disclosure, some technical features well-known in the art are not described, that is, not all features of actual examples are described herein, and well-known functions and structures are not described in detail.

In the accompanying drawings, like reference numerals denote like elements throughout the specification.

It should be understood that, spatially relative terms, such as "beneath", "below", "lower", "under", "over", "upper", and the like, may be used herein for ease of description to describe the relationship between one element or feature and other elements or features as illustrated in the figures. It should be understood that, the spatially relative terms are intended to further encompass different orientations of a device in use or operation in addition to the orientation depicted in the figures. For example, if a device in the drawings is turned over, then an element or a feature described as "below other elements", or "under other elements", or "beneath other elements" will be orientated to be "above" the other elements or features. Thus, the example terms, "below" and "beneath", may comprise both upper and lower orientations. The device may be orientated otherwise (rotated by 90 degrees or other orientations), and the spatially descriptive terms used herein are interpreted accordingly.

The terms used herein are only intended to describe the examples, and are not used as limitations of the present disclosure. As used herein, unless otherwise indicated expressly in the context, "a", "an" and "the" in a singular form are also intended to comprise a plural form. It should also be understood that the terms "consist of" and/or "comprise", when used in this specification, determine the presence of a feature, integer, step, operation, element and/or component, but do not preclude the presence or addition of one or more of other features, integers, steps, operations, elements, components, and/or groups. As used herein, the term "and/or" comprises any or all combinations of the listed relevant items.

As requirements of memory devices keep increasing, how to extend the service life of a memory device becomes a technical problem that urgently needs to be resolved in the field at present.

The memory system in the examples of the present disclosure comprises, but is not limited to, a memory system comprising a three-dimensional NAND memory. For ease of understanding, the memory system provided by the present disclosure is illustrated by taking the memory system comprising the three-dimensional NAND memory as an example.

FIG. 1 is a schematic diagram of an example system having a memory system provided by examples of the present disclosure. In the examples of the present disclosure, a system 100 may be a mobile phone, a desktop computer, a laptop computer, a tablet computer, a vehicle computer, a game console, a printer, a pointing device, a wearable electronic device, a smart sensor, a Virtual Reality (VR) device, an Augmented Reality (AR) device or any other suitable electronic devices having memories therein. As shown in FIG. 1, the system 100 may comprise a host end apparatus 101 and a memory system 102. The memory system 102 may comprise one or more memory devices 103 and a memory controller 104. The host end apparatus 101 may comprise a processor (e.g., a central processing unit (CPU)) or a system on chip (SOC) (e.g., an application processor (AP)) of an electronic apparatus. The host end apparatus 101 may be configured to send or receive data to or from the memory system 102.

In some implementations, the memory controller 104 is coupled to the memory devices 103 and the host end apparatus 101, and configured to control the memory devices 103. The memory controller 104 can manage the data stored in the memory devices 103 and communicate with the host end apparatus 101. In some implementations, the memory controller 104 is designed for operating in a low duty-cycle environment such as Secure Digital (SD) cards, Compact Flash (CF) cards, Universal Serial Bus (USB) flash drives, or other media for use in electronic apparatuses, such as personal computers, digital cameras, mobile phones, etc. In some other implementations, the memory controller 104 is designed for operating in a high duty-cycle environment such as a Solid-State Drive or an Embedded Multi-Media Card (eMMC).

In some examples, the memory controller 104 and one or more memory devices 103 can be integrated into various types of memory apparatuses, that is, the memory system 102 can be implemented and packaged in terminal electronic products of different types.

Figure 2:
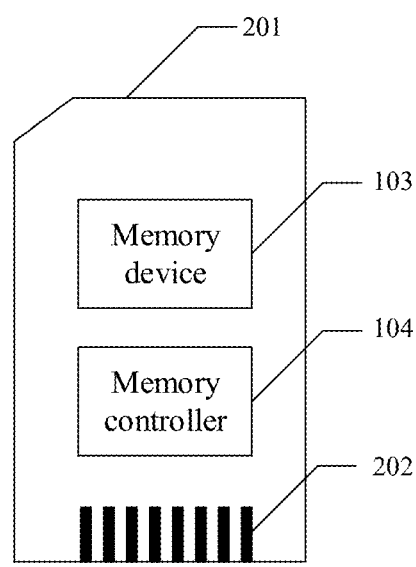
FIG. 2 is a schematic diagram of an example memory card having a memory system provided by examples of the present disclosure.
Figure 3:
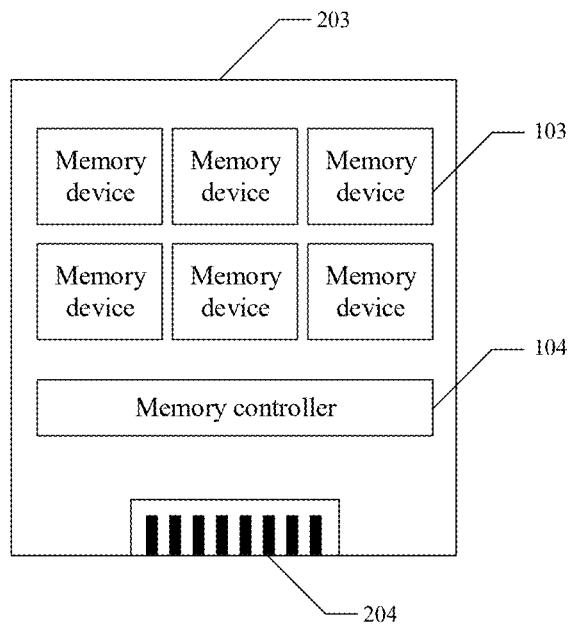
FIG. 3 is a schematic diagram of an example solid-state drive having a memory system provided by examples of the present disclosure.

In one example as shown in FIG. 2, the memory controller 104 and a single memory device 103 may be integrated into a memory card 201. The memory card 201 may be one of a compact flash card, a Smart Media Card (SMC), a Memory Stick (MS), a Multi-Media Card (MMC) (e.g., an RS-MMC, an MMCmicro, an eMMC, etc.), a secure digital card (e.g., a Mini SD card, a Micro SD card, an SDHC card, etc.), and a universal flash card. The memory card 201 may further comprise a memory card connector 202 coupling the memory card 201 with a host end apparatus (e.g., the host end apparatus 101 in FIG. 1). In another example as shown in FIG. 3, the memory controller 104 and a plurality of memory devices 103 may be integrated into an SSD 203. The SSD 203 may further comprise an SSD connector 204 coupling the SSD 203 with the host end apparatus (e.g., the host end apparatus 101 in FIG. 1). In some implementations, a storage capacity and/or an operating speed of the SSD 203 are greater than a storage capacity and/or an operating speed of the memory card 201.

Figure 4:
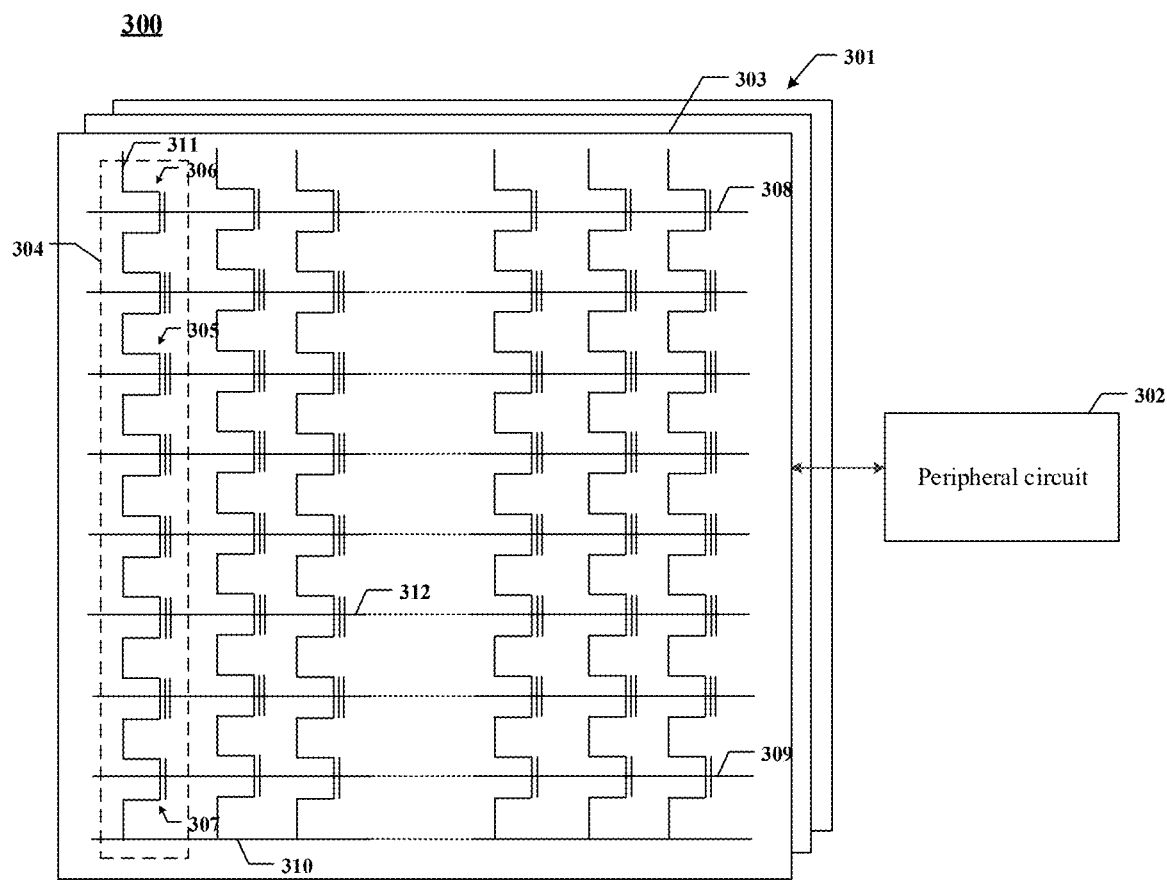
FIG. 4 is a schematic diagram of an example memory device comprising a peripheral circuit provided by examples of the present disclosure.

FIG. 4 is a schematic circuit diagram of an example memory device 300 comprising a peripheral circuit provided by examples of the present disclosure. The memory device 300 may be an example of the memory devices 103 in FIG. 1. The memory device 300 may comprise a memory array 301 and a peripheral circuit 302 coupled to the memory array 301. An illustration is made by taking the memory array 301 being a three-dimensional NAND memory array as an example. Memory cells 305 are NAND memory cells, and the memory cells 305 are provided in an array of memory strings 304, and each memory string 304 extends vertically above a substrate (not shown). In some implementations, each memory string 304 comprises a plurality of memory cells 305 that are coupled in series and stacked vertically. Each memory cell 305 can hold a continuous, analog value, such as an electrical voltage or charge, depending on the number of electrons trapped within a region of the memory cell 305. Each memory cell 305 may be either a floating gate memory cell that comprises a floating gate transistor, or a charge trap memory cell that comprises a charge trap transistor.

In some implementations, each memory cell 305 is a single-level cell (SLC) that has two possible memory states and thus can store one bit of data. For example, the first memory state "0" may correspond to a first range of voltage, and the second memory state "1" may correspond to a second range of voltage. In some implementations, each memory cell 305 is a multi-level cell (MLC) that is capable of storing more than a single bit of data in four or more memory states, e.g., a Multi-Level Cell (MLC) that stores two bits per cell, a Triple-Level Cell (TLC) that stores three bits per cell, or a Quad-Level Cell (QLC) that stores four bits per cell.

As shown in FIG. 4, each memory string 304 may comprise a bottom select transistor (BST) 307 at its source terminal and a top select transistor (TST) 306 at its drain terminal. The bottom select transistor 307 and the top select transistor 306 may be configured to activate the selected memory string 304 during read and program operations. In some implementations, sources of the memory strings 304 in a same memory block 303 may be coupled through a Common Source Line (CSL) 310. In other words, all the memory strings 304 in the same memory block 303 have an Array Common Source (ACS). According to some implementations, the top select transistor 306 of each memory string 304 is coupled to a corresponding bit line (BL) 311 which the data can be read from or written to via an output bus (not shown). In some implementations, each memory string 304 is configured to be selected or unselected by applying a select voltage (e.g., a voltage higher than a threshold voltage of the top select transistor 306) or an unselect voltage (e.g., 0 V) to a corresponding top select transistor 306 through one or more Top Select Lines (TSLs) 308 and/or by applying a select voltage (e.g., a voltage higher than a threshold voltage of the bottom select transistor 307) or an unselect voltage (e.g., 0 V) to a corresponding bottom select transistor 307 through one or more Bottom Select Lines (BSLs) 309.

As shown in FIG. 4, the memory string 304 may be organized into a plurality of memory blocks 303. Each of the plurality of memory blocks 303 may have the common source line 310. In some implementations, each memory block 303 is a basic data unit for an erase operation, i.e., all of the memory cells 305 on the same memory block 303 are erased at the same time. In order to erase the memory cells 305 in a selected memory block, the common source lines 310 coupled to the selected memory block as well as unselected memory blocks that are in the same plane as the selected memory block can be biased with an erase voltage. It is to be understood that in some examples, an erase operation may be performed at a half memory block level, a quarter memory block level, or a level having any suitable number of memory blocks or any suitable fractions of a memory block. The memory cells 305 of adjacent memory strings 304 may be coupled through word lines 312. The word lines 312 select which row of memory cells 305 is affected by the read or program operation.

Figure 5:
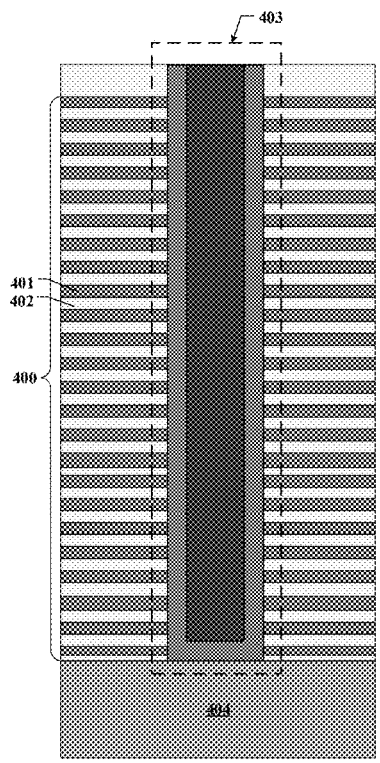
FIG. 5 is a schematic cross-sectional view of a memory array comprising a memory cell string provided by examples of the present disclosure.

FIG. 5 is a schematic cross-sectional view of a memory array comprising a memory string provided by examples of the present disclosure. As shown in FIG. 5, the memory array may comprise a stack structure 400. The stack structure 400 comprises a plurality of gate layers 401 and a plurality of insulation layers 402 that are disposed in a stack alternately and sequentially, and a channel structure 403 penetrating through the gate layers 401 and the insulation layers 402 vertically. The gate layers 401 and the insulation layers 402 may be stacked alternately, and two adjacent ones of the gate layers 401 are separated by one insulation layer 402. The number of memory cells that are comprised in the memory array is mainly related to the number of pairs of the gate layers 401 and the insulation layers 402 in the stack structure 400.

A constituent material of the gate layers 401 may comprise a conductive material. The conductive material comprises, but is not limited to, tungsten (W), cobalt (Co), copper (Cu), aluminum (Al), polysilicon, doped silicon, silicides, or any combination thereof. In some implementations, each gate layer 401 comprises a metal layer, e.g., a tungsten layer. In some implementations, each gate layer 401 comprises a doped polysilicon layer. The plurality of gate layers 401 surround one channel structure 403, to form one memory string. The gate layer 401 at the top of the stack structure 400 may extend laterally as a top select gate line; the gate layer 401 at the bottom of the stack structure 400 may extend laterally as a bottom select gate line; and the gate layers 401 that extend laterally between the top select gate line and the bottom select gate line may act as word line layers.

In some examples, the stack structure 400 may be disposed on a substrate 404. The substrate 404 may comprise silicon (e.g., monocrystalline silicon), silicon germanium (SiGe), gallium arsenide (GaAs), germanium (Ge), silicon on insulator (SOI), germanium on insulator (GOI), or any other suitable materials.

It is to be noted that, in some other examples, the memory array may only comprise the stack structure 400 but does not comprise the substrate. Whether the memory array comprises the substrate is not limited in the present disclosure.

In some implementations, the channel structure 403 comprises a functional layer, a channel layer, and an insulation filling layer. In some implementations, the channel layer comprises silicon, e.g., polysilicon. In some implementations, the functional layer is a composite dielectric layer comprising a tunneling layer, a storage layer (also known as a "charge trap/storage layer"), and a blocking layer. The channel structure 403 may have a cylindrical shape (e.g., a pillar shape). According to some implementations, the channel layer, the tunneling layer, the storage layer, and the blocking layer are arranged radially from the center toward the outer surface of the pillar in this order. The tunneling layer can comprise silicon oxide, silicon oxynitride, or any combination thereof. The storage layer can comprise silicon nitride, silicon oxynitride, or any combination thereof. The blocking layer can comprise silicon oxide, silicon oxynitride, a high dielectric constant (high-k) dielectric, or any combination thereof. In an example, the functional layer can comprise a composite layer of silicon oxide/silicon oxynitride/silicon oxide (ONO).

Figure 6:
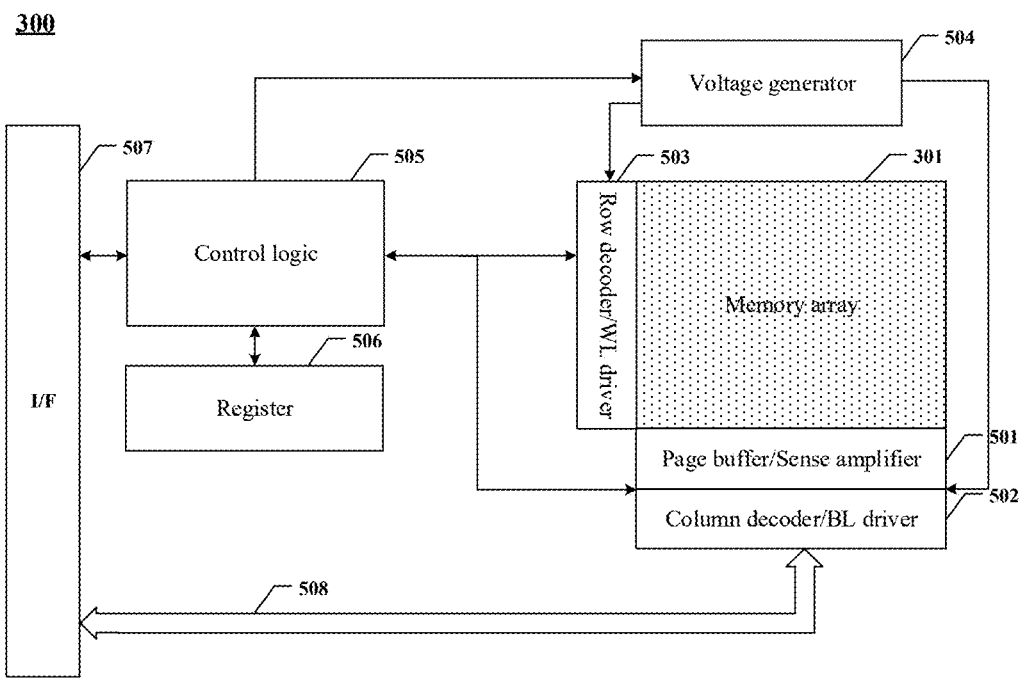
FIG. 6 is a schematic diagram of an example memory device comprising a memory array and a peripheral circuit provided by examples of the present disclosure.

Referring back to FIG. 4, the peripheral circuit 302 may be coupled to the memory array 301 through the bit lines 311, the word lines 312, the common source lines 310, the bottom select lines 309, and the top select lines 308. The peripheral circuit 302 may comprise any suitable analog, digital, and hybrid signal circuits for implementing the operations of the memory array 301 by applying and sensing voltage signals and/or current signals to each target memory cell 305 and from each target memory cell 305 via the bit lines 311, the word lines 312, the common source lines 310, the bottom select lines 309, and the top select lines 308. The peripheral circuit 302 may comprise various types of peripheral circuits formed using a metal-oxide-semiconductor technology. For example, FIG. 6 illustrates some example peripheral circuits. The peripheral circuit 302 comprises a page buffer/sense amplifier 501, a column decoder/bit line driver 502, a row decoder/word line driver 503, a voltage generator 504, a control logic 505, a register 506, a flash interface 507, and a data bus 508. It is to be understood that in some examples, additional peripheral circuits not shown in FIG. 6 may be comprised as well.

The page buffer/sense amplifier 501 may be configured to read and program (write) data from the memory array 301 and to the memory array 301 according to control signals from the control logic 505. In one example, the page buffer/sense amplifier 501 may store a page of program data (write data) to be programmed into the memory array 301. In another example, the page buffer/sense amplifier 501 may perform programming verification operations to ensure that the data has been properly programmed into memory cells coupled to selected word lines. In yet another example, the page buffer/sense amplifier 501 may also sense a low power signal from the bit lines that represents a data bit stored in the memory cells, and amplify a small voltage swing to a recognizable logic level in a reading operation. The column decoder/bit line driver 502 may be configured to be controlled by the control logic 505 and select one or more memory strings by applying bit line voltages generated from the voltage generator 504.

The row decoder/word line driver 503 may be configured to be controlled by the control logic 505 and select/unselect the memory blocks of the memory array 301 and select/unselect the word lines of the memory blocks. The row decoder/word line driver 508 may be further configured to drive word lines using word line voltages generated from the voltage generator 504. In some implementations, the row decoder/word line driver 503 may also select/unselect and drive the bottom select lines and the top select lines. As described below in detail, the row decoder/word line driver 503 is configured to perform program operations on the memory cells that are coupled to (one or more) selected word lines. The voltage generator 504 may be configured to be controlled by the control logic 505 and generate a word line voltage (such as, a read voltage, a program voltage, a pass voltage, a local voltage, a verify voltage, etc.), a bit line voltage and a source line voltage to be supplied to the memory array 301.

The control logic 505 may be coupled to each peripheral circuit described above and configured to control the operations of each peripheral circuit. The register 506 may be coupled to the control logic 505 and comprise a state register, a command register, and an address register for storing state information, command operation codes (OP codes), and command addresses for controlling the operations of each peripheral circuit. The flash interface 507 may be coupled to the control logic 505, and act as a control buffer to buffer and relay control commands received from a host end apparatus (not shown) to the control logic 505 and buffer and relay state information received from the control logic 505 to the memory controller. The flash interface 507 may be also coupled to the column decoder/bit line driver 502 via a data bus 508 and act as a data I/O interface and a data buffer to buffer and relay data to the memory array 301 or buffer or relay data from the memory array 301.

Figure 7:
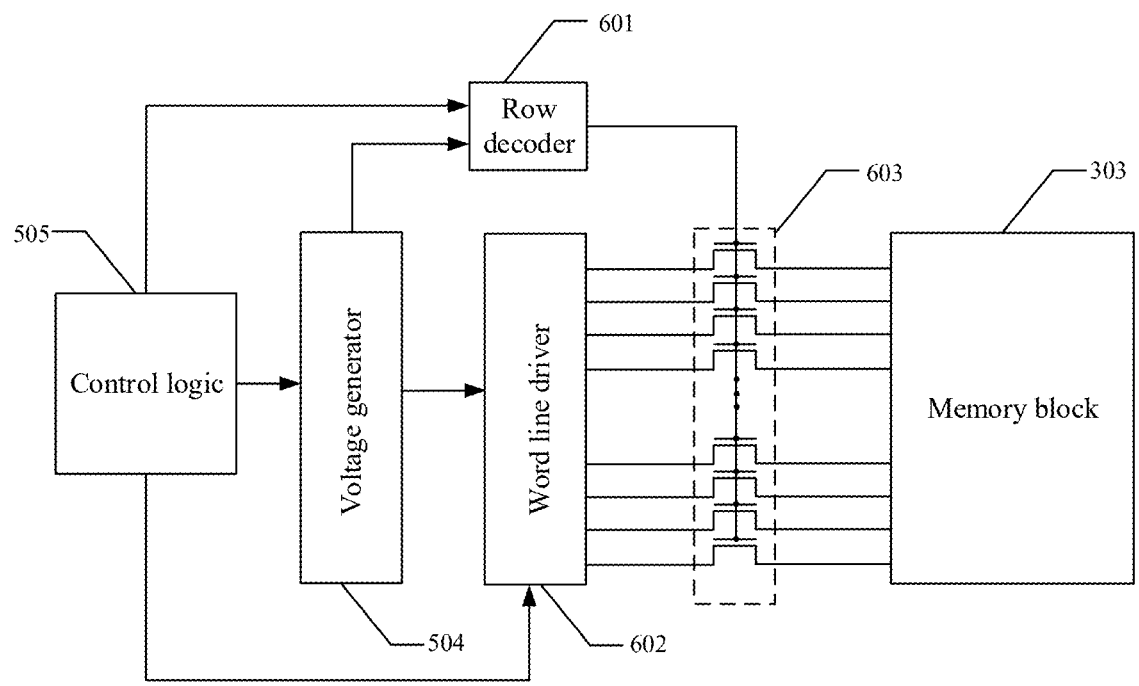
FIG. 7 is a schematic diagram of a memory block in a memory device and a partial peripheral circuit connected with the memory block provided by examples of the present disclosure.

In some examples, FIG. 7 is a schematic diagram of a memory block in a memory device and a partial peripheral circuit connected with the memory block. Referring to FIG. 4, FIG. 6, and FIG. 7 in combination, the memory device 300 comprises a peripheral circuit 302 and a memory array 301. The memory array 301 comprises at least one memory block 303. The peripheral circuit 302 comprises at least one row decoder 601. One memory block 303 is correspondingly connected with one row decoder 601.

In some examples, referring to FIG. 7, the peripheral circuit further comprises a word line driver 602 and a plurality of driving transistors 603, a first ends of the driving transistors 603 are connected with the word line driver 602, a second ends of the driving transistors 603 are connected with a word line in the memory block 303, and a control ends of the driving transistors 603 are connected with an output end of the row decoder 601. When an operation needs to be performed on a memory cell in the memory block 303, the control logic 505 sends an address signal corresponding to the memory block 303 to the row decoder 601. The row decoder 601 generates an output signal based on the address signal. The driving transistors 603 are turned on after receiving the output signal, and couples the word line driver 602 with the word line in the memory block 303, so that a word line voltage can be provided to the corresponding word line in the memory block 303 through the word line driver 602.

In some examples, when a read operation or a program operation needs to be performed on the memory cell in the memory block 303, a high word line voltage needs to be applied to the word line. Output signals applied to gates of the driving transistors 603 also need to have a high voltage, to ensure that the plurality of driving transistors 603 can all be turned on. In order to reduce overall power consumption of the row decoder 601, an operating voltage used for a logic circuit in the row decoder 601 is relatively low, and the row decoder 601 further needs to comprise a level conversion circuit connected with the logic circuit, to convert an output signal with a low level generated by the logic circuit into an output signal with a high level. The level conversion circuit bears a large voltage difference in an operation process, which tends to cause degradation of electrical performance of circuit elements. Therefore, how to increase the service life of the level conversion circuit becomes a problem that urgently needs to be resolved at present. For this, the present disclosure provides the following implementation.

Figure 8:
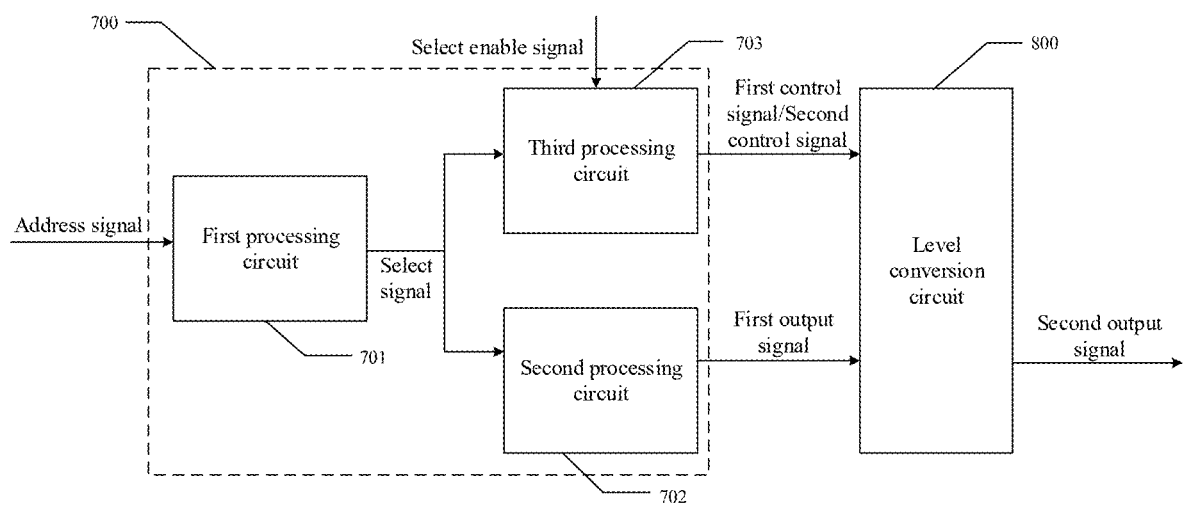
FIG. 8 is a schematic composition diagram of a row decoder provided by examples of the present disclosure.

FIG. 8 is a schematic composition diagram of a row decoder provided by examples of the present disclosure. Referring to FIG. 7 and FIG. 8 in combination, the row decoder 601 comprises a logic circuit 700 and a level conversion circuit 800. The logic circuit 700 is configured to generate a first control signal, a second control signal, and a first output signal based on an address signal and a status signal of the memory block 303 correspondingly connected with the row decoder 601. The level conversion circuit 800 is configured to generate a second output signal based on the first output signal in response to the first control signal and the second control signal respectively.

In examples of the present disclosure, based on the address signal and the status signal of the memory block 303 correspondingly connected with the row decoder 601, the logic circuit 700 may sequentially generate the first control signal and the second control signal, and a level of the second control signal is higher than a level of the first control signal. In response to the first control signal, the level conversion circuit 800 is turned on and remains in an on state, and generates the second output signal based on the first output signal. When the first control signal is turned into the second control signal, the level conversion circuit 800 can still remain in an on state, and generate the second output signal based on the first output signal.

In some examples, the logic circuit 700 comprises a first processing circuit 701, a second processing circuit 702, and a third processing circuit 703. An input end of the second processing circuit 702 and an input end of the third processing circuit 703 are respectively connected with an output end of the first processing circuit 701, an output end of the second processing circuit 702 is connected with an input end of the level conversion circuit 800, and an output end of the third processing circuit 703 is connected with a control end of the level conversion circuit 800.

FIG. 9 to FIG. 12 are circuit diagrams of the first processing circuit 701, the second processing circuit 702, the third processing circuit 703, and the level conversion circuit 800 provided by some examples of the present disclosure.

In some examples, the first processing circuit 701 is configured to generate a select signal based on the address signal and the status signal of the memory block 303.

Figure 9:
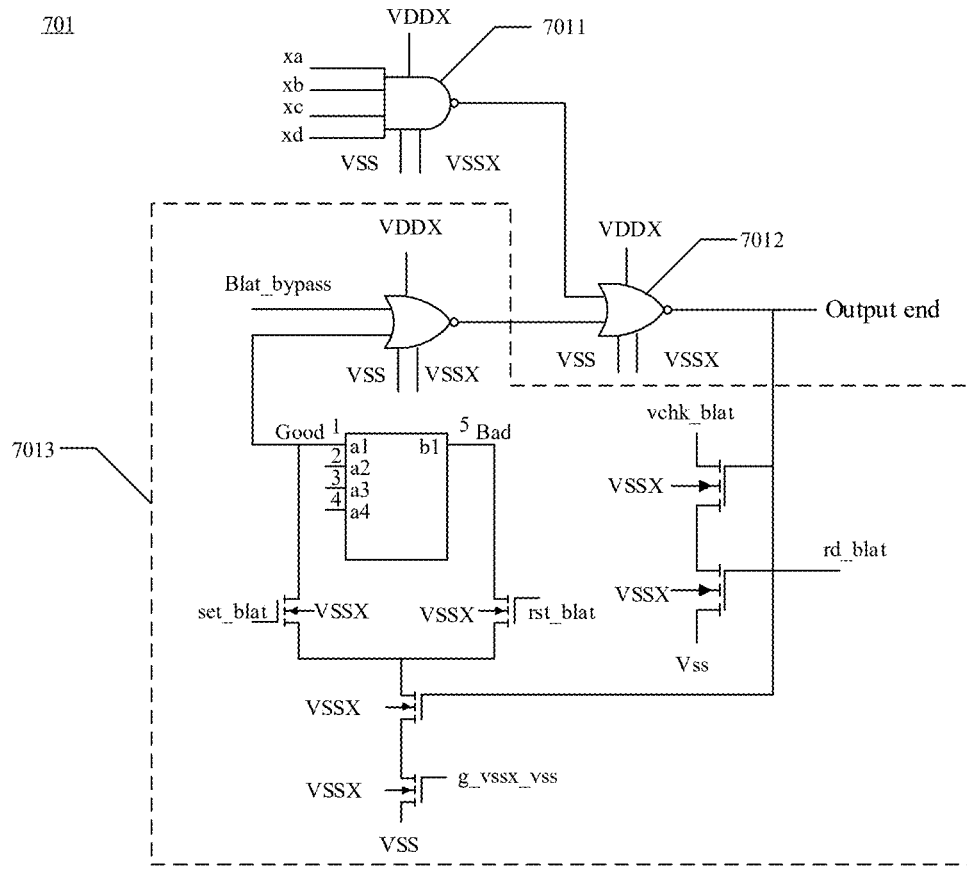
FIG. 9 is a circuit diagram of a first processing circuit provided by examples of the present disclosure.

In some examples, as shown in FIG. 9, the first processing circuit 701 comprises: a second NAND gate 7011, configured to receive the address signal of the memory block 303 correspondingly connected with the row decoder 601, and generate a first initial select signal based on the address signal of the memory block 303; a state latch circuit 7013, configured to generate a second initial select signal based on the status signal of the memory block 303; and a first NOR gate 7012, configured to receive the first initial select signal and the second initial select signal, and generate the select signal based on the first initial select signal and the second initial select signal.

In an example, when the memory block 303 correspondingly connected with the row decoder 601 is selected, address signals xa, xb, xc, and xd received by the second NAND gate 7011 are all at a logic high level. The second NAND gate 7011 receives the address signals and outputs the first initial select signal. The first initial select signal is at a logic low level.

The state latch circuit 7013 is configured to latch the state information of the memory block 303 correspondingly connected with the row decoder 601. In an example, the control logic 505 may set an output value of a state latch through control signals set_blat and rst_blat based on a state of the memory block 303, to mark the state of the memory block 303. When the memory block 303 is a usable good block, an al terminal of the state latch outputs a signal at a logic high level. In this case, if a signal Blat_bypass is at a logic high level, it represents that the memory block 303 may be selected. The state latch circuit 7013 outputs the second initial select signal. The second initial select signal is at a logic low level.

In a case that the second NAND gate 7011 outputs the first initial select signal and the state latch circuit 7013 outputs the second initial select signal, the first NOR gate 7012 receives the first initial select signal and the second initial select signal, and outputs the select signal. The first initial select signal and the second initial select signal are both at a logic low level, and the select signal is at a logic high level.

In some examples, the second processing circuit 702 is configured to generate a first output signal based on the select signal.

Figure 10:
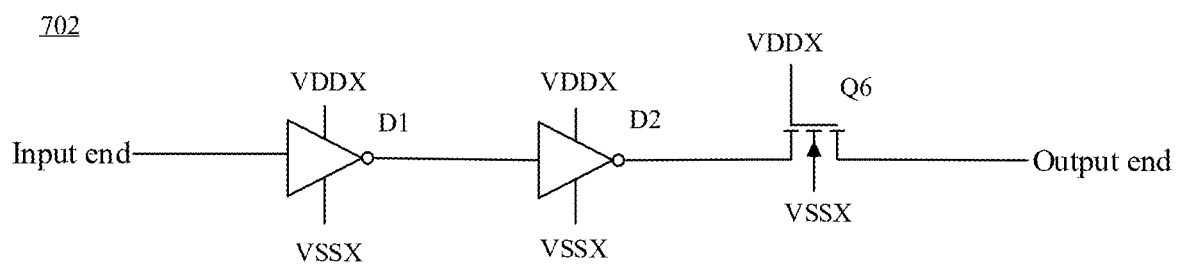
FIG. 10 is a circuit diagram of a second processing circuit provided by examples of the present disclosure.

In some examples, as shown in FIG. 10, the second processing circuit 702 comprises N phase inverters and a sixth transistor Q6. The N phase inverters are sequentially connected. An input end of a first phase inverter is connected with the output end of the first processing circuit 701. A first end of the sixth transistor Q6 is connected with an output end of a last phase inverter. A second end of the sixth transistor Q6 is connected with the input end of the level conversion circuit 800.

It is taken as an example here that the second processing circuit 702 comprises a phase inverter D1 and a phase inverter D2, that is, N is 2. And the present disclosure is not limited thereto. In other examples, N may also be an even number greater than 2, e.g., 4, 6, or 8.

In a case that the first processing circuit 701 outputs the select signal at a logic high level, the second processing circuit 702 may generate the first output signal based on the select signal. The first output signal is at a logic high level.

In some examples, the third processing circuit 703 is configured to generate a first control signal and a second control signal based on the select signal.

Figure 11:
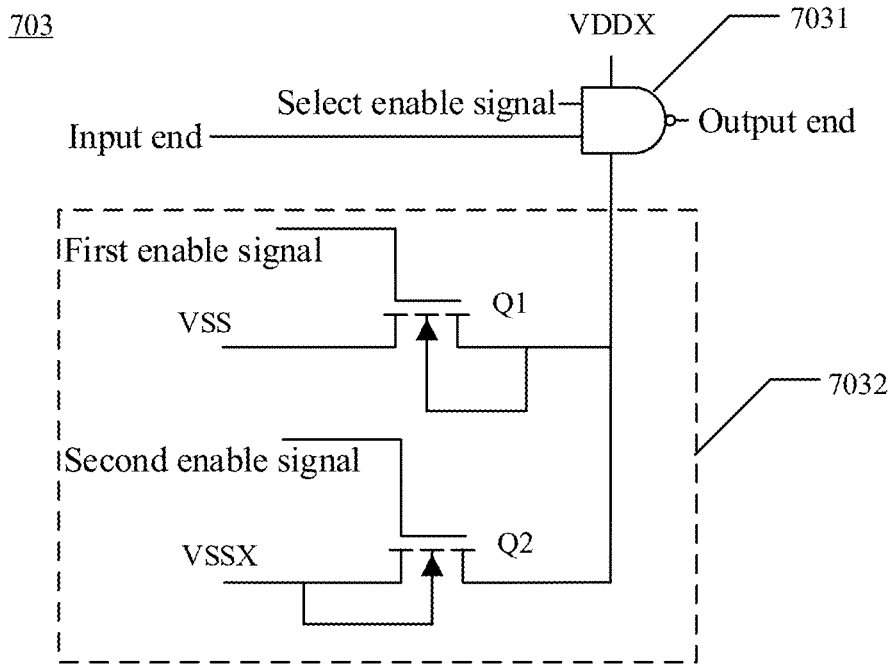
FIG. 11 is a circuit diagram of a third processing circuit provided by examples of the present disclosure.

In some examples, as shown in FIG. 11, the third processing circuit 703 comprises a first NAND gate 7031 and a low level select circuit 7032 connected with a low level end of the first NAND gate 7031. A first input end of the first NAND gate 7031 is connected with the output end of the first processing circuit 701. A second input end of the first NAND gate 7031 is connected with a select enable signal.

In an example, the low level select circuit 7032 comprises: a first transistor Q1, wherein a first end of the first transistor Q1 is connected with the low level end of the first NAND gate 7031, a second end of the first transistor Q1 is configured to receive a second low level VSS, and a control end of the first transistor Q1 is connected with a first enable signal; and a second transistor Q2, wherein a second end of the second transistor Q2 is connected with the low level end of the first NAND gate 7031 and the first end of the first transistor Q1, a first end of the second transistor Q2 is configured to receive a first low level VSSX, and a control end of the second transistor Q2 is connected with a second enable signal.

In some examples, the first transistor Q1 and the second transistor Q2 are both NMOS transistors, the first end of the first transistor Q1 and the first end of the second transistor Q2 are both source terminals, and the second ends are both drain terminals.

In examples of the present disclosure, the first enable signal and the second enable signal may be complementary signals. That is, when the first enable signal is at a logic high level, the second enable signal is at a logic low level, and when the first enable signal is at a logic low level, the second enable signal is at a logic high level. In a case that the first enable signal is at a logic low level and the second enable signal is at a logic high level, the first transistor Q1 is turned off, and the second transistor Q2 is turned on. The low level select circuit 7032 may provide the first low level VSSX received by the first end of the second transistor Q2 to the low level end of the first NAND gate 7031. In a case that the first enable signal is at a logic high level and the second enable signal is at a logic low level, the first transistor Q1 is turned on, and the second transistor Q2 is turned off. The low level select circuit 7032 may provide the second low level VSS received by the second end of the first transistor Q1 to the low level end of the first NAND gate 7031.

In some examples, the peripheral circuit further comprises a low-voltage level converter (not shown in the figure) connected with the logic circuit 700 and the control logic 505. The low-voltage level converter is configured to convert an initial enable signal with a high level generated by the control logic 505 into the first enable signal and the second enable signal with a low level, so that the levels of the first enable signal and the second enable signal fall in a range of an operating voltage in a region where the logic circuit 700 is located.

In examples of the present disclosure, in a case that the first input end of the first NAND gate 7031 receives the select signal with a logic high level and the second input end receives the select enable signal with a logic high level, the first NAND gate 7031 outputs a control signal. The control signal is at a logic low level. When the low level select circuit 7032 provides the first low level VSSX to the low level end of the first NAND gate 7031, the first NAND gate 7031 outputs the first control signal whose level is the first low level VSSX. When the low level select circuit 7032 provides the second low level VSS to the low level end of the first NAND gate 7031, the first NAND gate 7031 outputs the second control signal whose level is the second low level VSS.

In some examples, the second low level VSS is higher than the first low level VSSX.

In an example, the first low level VSSX may be −2 V, and the second low level VSS may be 0 V.

It is to be noted that, in examples of the present disclosure, the level values of the first low level VSSX and the second low level VSS are not limited to level values in the above example. For example, a range of the first low level VSSX may be −3 V to −1.5 V, and a range of the second low level VSS may be −0.5 V to 1 V.

In some examples, the level conversion circuit 800 is configured to generate a second output signal based on the first output signal in response to the first control signal and the second control signal respectively.

Figure 12:
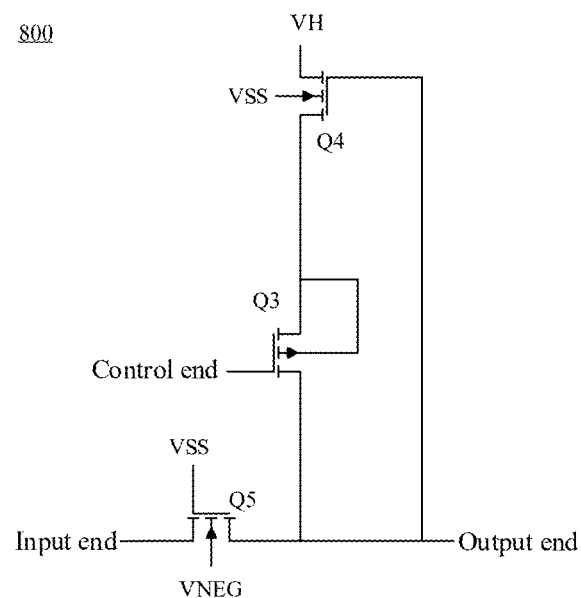
FIG. 12 is a circuit diagram of a level conversion circuit provided by examples of the present disclosure.

In some examples, as shown in FIG. 12, the level conversion circuit 800 comprises: a third transistor Q3, wherein a control end of the third transistor Q3 is connected with the output end of the third processing circuit 703; a fourth transistor Q4, wherein a first end of the fourth transistor Q4 is connected with a first end of the third transistor Q3, and a second end of the fourth transistor Q4 is configured to receive a first high level VH; and a fifth transistor Q5, wherein a first end of the fifth transistor Q5 is connected with the output end of the second processing circuit 702, a second end of the fifth transistor Q5 is connected with a second end of the third transistor Q3, and an end at which the second end of the fifth transistor Q5 and the second end of the third transistor Q3 are connected with each other is used as an output end of the level conversion circuit 800 and is connected with a control end of the fourth transistor Q4.

For the level conversion circuit 800, when the input end thereof receives the first output signal generated by the second processing circuit 702 and the control end thereof receives the first control signal generated by the third processing circuit 703, the fifth transistor Q5 and the fourth transistor Q4 are turned on, the third transistor Q3 is turned on accordingly, and a level of the output end gradually rises to the first high level VH. Here, because the level of the first control signal is the first low level VSSX, a large voltage difference may be formed between the control end and the first end of the third transistor Q3, so that the level conversion circuit 800 is quickly turned on. After the voltage of the output end of the level conversion circuit 800 rises to the first high level VH, the voltage difference between the control end of the third transistor Q3 and the first end or second end thereof is stabilized at VSSX-VH.

In an example, the third transistor Q3 is a P-type DMOS transistor, has a small turn-on resistance and a high turn-on speed, and can make the level conversion circuit 800 be quickly turned on and make the level of the output end of the level conversion circuit 800 quickly rise to the first high level VH.

Figure 13:
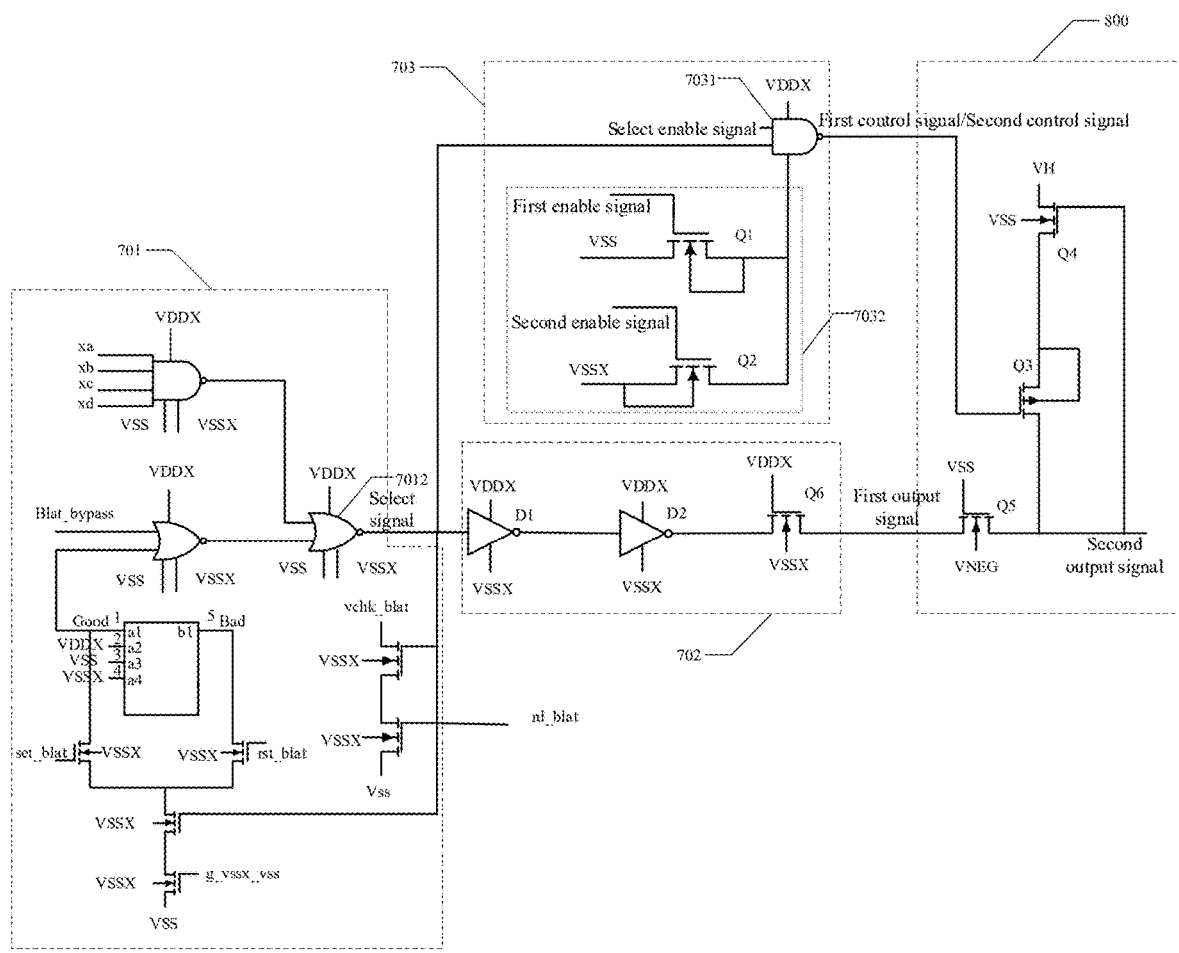
FIG. 13 is a circuit diagram of a row decoder provided by examples of the present disclosure.

FIG. 13 is a circuit diagram of a row decoder provided by examples of the present disclosure. As shown in FIG. 13, the row decoder comprises the first processing circuit 701, the second processing circuit 702, the third processing circuit 703, and the level conversion circuit 800 shown in FIG. 9 to FIG. 12. An output end of the first NOR gate 7012 in the first processing circuit 701 is connected with an input end of the phase inverter D1 in the second processing circuit 702 and a first input end of the first NAND gate 7031 in the third processing circuit 703. The second end of the sixth transistor Q6 in the second processing circuit 702 is connected with the first end of the fifth transistor Q5 in the level conversion circuit 800. An output end of the first NAND gate 7031 of the third processing circuit 703 is connected with the control end of the third transistor Q3 in the level conversion circuit 800.

In examples of the present disclosure, the peripheral circuit further comprises the control logic 505 coupled with the row decoder 601. The control logic 505 is configured to generate the select enable signal, the first enable signal, and second enable signal in response to one of a read enable signal, a program enable signal, and a verify enable signal.

Figure 14:
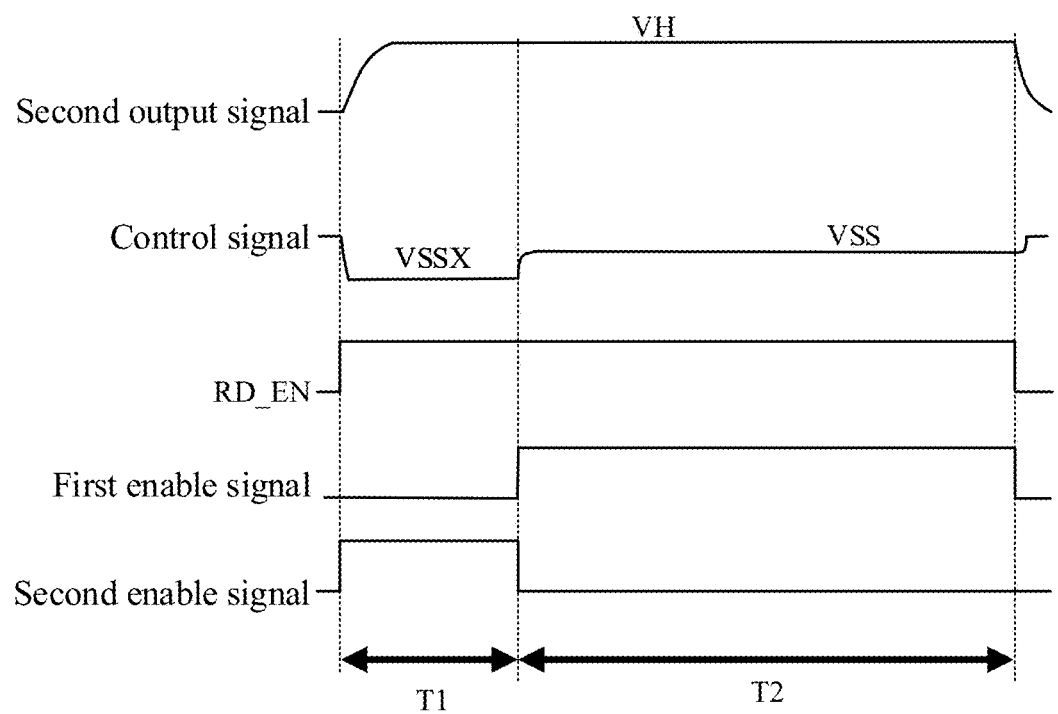
FIG. 14 is a voltage curve when a read operation is performed provided by an example of the present disclosure.

FIG. 14 is a voltage curve when a read operation is performed provided by an example of the present disclosure. Referring to FIG. 13 and FIG. 14 in combination, when a read enable signal RD_EN is converted into a logic high level, the control logic 505 may set the first enable signal to a logic low level and set the second enable signal to a logic high level in a first period T1. In this case, the first transistor Q1 in the low level select circuit 7032 is turned off, and the second transistor Q2 is turned on. The first low level VSSX connected with the first end of the second transistor Q2 may be provided to the low level end of the first NAND gate 7031. The first NAND gate 7031 receives the select signal and the select enable signal and outputs the first control signal whose level is the first low level VSSX. In a second period T2 after the first period T1, the control logic 505 sets the first enable signal to a logic high level and sets the second enable signal to a logic low level. In this case, the first transistor Q1 is turned on, the second transistor Q2 is turned off, the second low level VSS connected with the first end of the first transistor Q1 may be provided to the low level end of the first NAND gate 7031. An output signal of the first NAND gate 7031 is converted from the first control signal whose level is the first low level VSSX into the second control signal whose level is the second low level VSS.

In some examples, a range of the first period T1 is 0.5 microseconds to 1 microsecond. In the first period T1, the third transistor Q3 in the level conversion circuit 800 may be turned on, and a level of an output signal of the level conversion circuit 800 may gradually rise until the second output signal generated by the level conversion circuit 800 reaches the first high level VH. In the second period T2, the control end of the third transistor Q3 receives the second control signal whose level is the second low level VSS. The third transistor Q3 may still remain in an on state. The level conversion circuit 800 can still keep an output of the second output signal whose level is the first high level VH. In this case, an absolute value of a voltage difference between the control end and the first end or the second end of the third transistor Q3 is VH-VSS, and is less than an absolute value VH-VSSX of a voltage difference between the control end and the first end or the second end of the third transistor Q3 in the first period T1. That is, compared with the first period T1, in the second period T2, a voltage difference applied to the third transistor Q3 is reduced.

Figure 15:
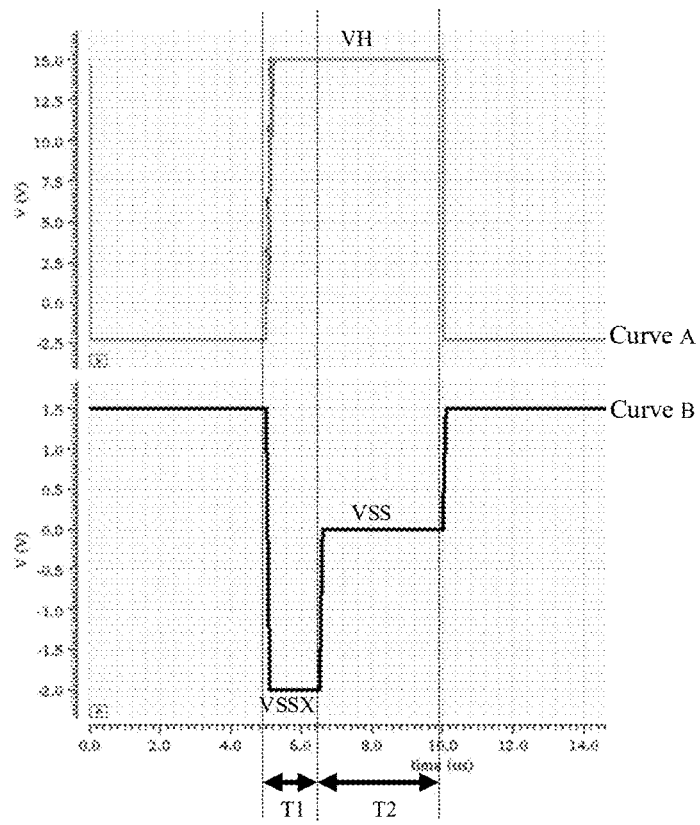
FIG. 15 is a diagram 1 of a simulation result of a row decoder provided by examples of the present disclosure.

FIG. 15 is a diagram 1 of a simulation result of the row decoder shown in FIG. 13. A curve A is a voltage curve of the output end of the level conversion circuit 800, and a curve B is a voltage curve of the output end of the third processing circuit 703. As shown in FIG. 15, in the first period T1, the third processing circuit 703 outputs the first control signal whose level is the first low level VSSX, the first low level VSSX is −2 V, the voltage of the output end of the level conversion circuit 800 rises until the voltage reaches the first high level VH, and the first high level VH is 15 V. In the second period T2, the third processing circuit 703 outputs the second control signal whose level is the second low level VSS, the second low level VSS is 0 V, and the output end of the level conversion circuit 800 may can still keep the output of the second output signal whose level is the first high level VH. As a result, it shows that in the second period T2 the level of the control signal received by the control end of the level conversion circuit 800 is increased from the first low level VSSX to the second low level VSS without affecting the normal operation of the level conversion circuit 800.

In an example, when a read operation needs to be performed on a memory block, the first high level VH is 15 V. The voltage difference between the control end and the first end or the second end of the third transistor Q3 in the first period T1 reaches −17 V. If the third transistor Q3 operates at a large negative bias voltage for a long time, degradation of electrical performance may occur due to a Negative Bias Temperature Instability (NBTI) effect. As a result, a threshold voltage of the third transistor Q3 drifts in a negative direction, a sub-threshold slope is reduced, a turn-on rate of the level conversion circuit 800 is reduced, and the service life is shortened.

In examples of the present disclosure, the row decoder 601 comprises a low level select circuit 7032 connected with the low level end of the first NAND gate 7031. The low level select circuit 7032 may provide the first low level VSSX to the low level end of the first NAND gate 7031 in the first period T1, and provide the second low level VSS to the low level end of the first NAND gate 7031 in the second period T2, so that the first NAND gate 7031 outputs the first control signal whose level is the first low level VSSX in the first period T1 and outputs the second control signal whose level is the second low level VSS in the second period T2, to enable the level conversion circuit 800 to quickly establish positive feedback and is turned on in the first period T1. In the second period T2, the absolute value of the voltage difference between the control end and the first end or the second end of the third transistor Q3 is reduced to VH-VSS, so that operation duration of the third transistor Q3 at a large negative bias voltage can be shortened, the NBTI of the third transistor Q3 can be mitigated, a degradation degree of the electrical performance of the third transistor Q3 can be reduced, and the service life of the level conversion circuit 800 can be increased.

FIG. 16 is a diagram 2 of a simulation result of the row decoder shown in FIG. 13. The simulation result is a voltage curve obtained by an analog row decoder after ten years of read cycles. A plurality of curves C are voltage curves of the output end of the level conversion circuit 800, and a curve D is a voltage curve of the output end of the third processing circuit 703. As shown in FIG. 16, as the number of times of read increases, a voltage rise rate of the output end of the level conversion circuit 800 decreases. After ten years of read cycles, the circuit may still ensure normal functions. That is, the level conversion circuit 800 can still keep the output of the second output signal whose level is the first high level VH. Furthermore, according to a simulation result, after ten years of read cycles, an attenuation degree of a linear region drain current of the third transistor Q3 is 15%. For the third transistor Q3 of which the levels of the control signal received by the control end in the first period T1 and the second period T2 are both the first low level VSSX, the attenuation degree of the linear region drain current after ten years of read cycles reaches 40%. As a result, it shows that the level of the control signal received by the control end of the level conversion circuit 800 is increased from the first low level VSSX to the second low level VSS in the second period T2, so that the NBTI of the third transistor Q3 can be mitigated, and the degradation degree of the electrical performance of the third transistor Q3 can be reduced.

It is to be noted that in the above example, it is taken as an example that a memory block 303 is selected to perform a read operation on the memory block 303. In other examples, e.g., when a memory block 303 needs to be selected to perform a program operation on the memory block 303, the control logic 505 may generate the select enable signal, the first enable signal, and the second enable signal based on the program enable signal, and a difference from the above example may only lie in that the second end of the fourth transistor Q4 in the level conversion circuit 800 receives a second high level. Level values of the second high level and the first high level VH may be different. The first high level VH and the second high level herein are both far greater than a high level VDDX used in the logic circuit 700.

Based on an idea similar to that of the above memory device, the present disclosure further provides a memory system. The memory system comprises: at least one memory device in any one of the foregoing examples; and a memory controller, coupled with the at least one memory device and configured to control the memory device. For the example composition and functional implementation of the memory system, refer to the description of FIG. 1 to FIG. 6 above. For brevity, details are not repeated herein.

The present disclosure further provides an operation method of a memory device. FIG. 17 is a schematic flowchart of an operation method of a memory device provided by examples of the present disclosure. As shown in FIG. 17, the operation method of the memory device comprises the following operations.

Operation S10: A logic circuit in a row decoder of the memory device generates a first control signal, a second control signal, and a first output signal based on an address signal and a status signal of a memory block correspondingly connected with the row decoder, wherein a level of the second control signal is higher than a level of the first control signal.

Operation S20: A level conversion circuit in the row decoder generates a second output signal based on the first output signal in response to the first control signal and the second control signal respectively.

In some examples, referring to FIG. 7 and FIG. 8 in combination, performing Operation S10 comprises: generating, by a first processing circuit 701 in the logic circuit 700, a select signal based on the address signal and the status signal of the memory block 303; generating, by a second processing circuit 702 in the logic circuit 700, the first output signal based on the select signal; and generating, by a third processing circuit 703 in the logic circuit 700, the first control signal and the second control signal based on the select signal. The select signal here is at a logic high level.

In some examples, the operation method of the memory device further comprises: generating, by a control logic 505 in the memory device, the select enable signal, the first enable signal, and the second enable signal based on one of a read enable signal, a program enable signal, and a verify enable signal. That is, the operation method of the memory device provided by the examples of the present disclosure is applicable to cases in which a read operation, a program operation, or a verify operation is performed on the memory block 303.

In some examples, referring to FIG. 8, FIG. 13, and FIG. 14 in combination, generating, by the third processing circuit 703 in the logic circuit 700, the first control signal and the second control signal based on the select signal comprises: outputting, by a low level select circuit 7032 in the third processing circuit 703, a first low level VSSX to a low level end of a first NAND gate 7031 in the third processing circuit 703 in a first period T1, and outputting a second low level VSS to the low level end of the first NAND gate 7031 in a second period T2; and outputting, by the first NAND gate 7031, the first control signal whose level is the first low level VSSX based on the select signal and a select enable signal in the first period T1, and outputting the second control signal whose level is the second low level VSS in the second period T2. The select enable signal here is at a logic high level.

In some examples, referring to FIG. 13 and FIG. 14 in combination, outputting, by the low level select circuit 7032 in the third processing circuit 703, the first low level VSSX to the low level end of a first NAND gate 7031 in the third processing circuit 703 in the first period T1, and outputting the second low level VSS to the low level end of the first NAND gate 7031 in the second period T2 comprises: applying a first enable signal to a control end of a first transistor Q1 in the low level select circuit 7032, and applying a second enable signal to a control end of a second transistor Q2 in the low level select circuit 7032, wherein in the first period T1, the first enable signal is a low level signal, the first transistor Q1 is turned off, the second enable signal is a high level signal, the second transistor Q2 is turned on, and the first low level VSSX is outputted to the low level end of the first NAND gate 7031; and in the second period, the first enable signal is a high level signal, the first transistor Q1 is turned on, the second low level VSS is outputted to the low level end of the first NAND gate 7031, the second enable signal is a low level signal, and the second transistor Q2 is turned off.

In some examples, a range of the first period T1 is 0.5 microseconds to 1 microsecond.

In examples of the present disclosure, when an operation needs to be performed on the memory block 303 correspondingly connected with the row decoder 601, under the action of the first enable signal and the second enable signal generated by the control logic 505, the low level select circuit 7032 in the logic circuit 700 may provide the first low level VSSX to the low level end of the first NAND gate 7031 in the first period T1, and provide the second low level VSS to the low level end of the first NAND gate 7031 in the second period T2, so that the first NAND gate 7031 may output the first control signal whose level is the first low level VSSX in the first period T1 and outputs the second control signal whose level is the second low level VSS in the second period T2. The second low level VSS is higher than the first low level VSSX. In response to the first control signal and the second control signal, the level conversion circuit 800 may generate the second output signal based on the first output signal generated by the logic circuit 700. In the first period T1, the absolute value of the voltage difference between the control end and the first end or the second end of the third transistor Q3 in the level conversion circuit 800 reaches VH-VSSX, and in the second period T2, the absolute value of the voltage difference between the control end and the first end or the second end of the third transistor Q3 is reduced to VH-VSS, so that operation duration of the third transistor Q3 at a large negative bias voltage can be shortened, the NBTI of the third transistor Q3 can be mitigated, a degradation degree of the electrical performance of the third transistor Q3 can be reduced, and the service life of the level conversion circuit 800 can be increased.

In view of this, examples of the present disclosure provide a memory device, an operation method thereof, and a memory system to solve at least one problem existing in the prior art.

To achieve the above purpose, the technical solution of the examples of the present disclosure is achieved as follows:

In a first aspect, examples of the present disclosure provide a memory device. The memory device comprises a peripheral circuit and a memory array coupled with the peripheral circuit, wherein the memory array comprises at least one memory block, the peripheral circuit comprises at least one row decoder, one memory block is correspondingly connected with one row decoder, and the row decoder comprises a logic circuit and a level conversion circuit.

the logic circuit is configured to generate a first control signal, a second control signal, and a first output signal based on an address signal and a status signal of the memory block correspondingly connected with the row decoder, wherein a level of the second control signal is higher than a level of the first control signal; and the level conversion circuit is configured to generate a second output signal based on the first output signal in response to the first control signal and the second control signal respectively.

In an optional implementation, the logic circuit comprises a first processing circuit, a second processing circuit, and a third processing circuit, an input end of the second processing circuit and an input end of the third processing circuit are respectively connected with an output end of the first processing circuit, an output end of the second processing circuit is connected with an input end of the level conversion circuit, and an output end of the third processing circuit is connected with a control end of the level conversion circuit, wherein:

the first processing circuit is configured to generate a select signal based on the address signal and the status signal of the memory block;

the second processing circuit is configured to generate the first output signal based on the select signal; and the third processing circuit is configured to generate the first control signal and the second control signal based on the select signal.

In an optional implementation, the third processing circuit comprises a first NAND gate and a low level select circuit connected with a low level end of the first NAND gate, a first input end of the first NAND gate is connected with the output end of the first processing circuit, and a second input end of the first NAND gate is connected with a select enable signal, wherein:

the low level select circuit is configured to output a first low level to the low level end of the first NAND gate in a first period, and output a second low level to the low level end of the first NAND gate in a second period; and the first NAND gate is configured to output the first control signal whose level is the first low level based on the select signal and the select enable signal in the first period, and output the second control signal whose level is the second low level in the second period.

In an optional implementation, the low level select circuit comprises:

a first transistor, wherein a first end of the first transistor is connected with the low level end of the first NAND gate; a second end of the first transistor is configured to receive the second low level; a control end of the first transistor is connected with a first enable signal; in the first period, the first enable signal is a low level signal, and the first transistor is turned off; and in the second period, the first enable signal is a high level signal, and the first transistor is turned on; and a second transistor, wherein a second end of the second transistor is connected with the low level end of the first NAND gate and the first end of the first transistor; a first end of the second transistor is configured to receive the first low level; a control end of the second transistor is connected with a second enable signal; in the first period, the second enable signal is a high level signal, and the second transistor is turned on; and in the second period, the second enable signal is a low level signal, and the second transistor is turned off.

In an optional implementation, the peripheral circuit further comprises a control logic, and the control logic is configured to:

generate the select enable signal, the first enable signal, and the second enable signal based on one of a read enable signal, a program enable signal, and a verify enable signal.

In an optional implementation, the level conversion circuit comprises:

a third transistor, wherein a control end of the third transistor is connected with the output end of the third processing circuit;

a fourth transistor, wherein a first end of the fourth transistor is connected with a first end of the third transistor, and a second end of the fourth transistor is configured to receive a first high level; and a fifth transistor, wherein a first end of the fifth transistor is connected with the output end of the second processing circuit, a second end of the fifth transistor is connected with a second end of the third transistor, and an end at which the second end of the fifth transistor and the second end of the third transistor are connected with each other is used as an output end of the level conversion circuit and is connected with a control end of the fourth transistor.

In an optional implementation, the first processing circuit comprises:
- a second NAND gate, wherein the second NAND gate is configured to receive the address signal of the memory block correspondingly connected with the row decoder, and generate a first initial select signal based on the address signal of the memory block;
- a state latch circuit, wherein the state latch circuit is configured to generate a second initial select signal based on the status signal of the memory block; and
- a first NOR gate, wherein the first NOR gate is configured to receive the first initial select signal and the second initial select signal, and generate the select signal based on the first initial select signal and the second initial select signal.

In an optional implementation, the second processing circuit comprises:
- N phase inverters, wherein the N phase inverters are sequentially connected, an input end of a first phase inverter is connected with the output end of the first processing circuit, and N is an even number greater than zero; and
- a sixth transistor, wherein a first end of the sixth transistor is connected with an output end of a last phase inverter, and a second end of the sixth transistor is connected with the input end of the level conversion circuit.

In an optional implementation, the peripheral circuit further comprises a word line driver and a plurality of driving transistors, a first ends of the driving transistors are connected with the word line driver, a second ends of the driving transistors are connected with a word line in the memory block, a control ends of the driving transistors are connected with the output end of the level conversion circuit, and the driving transistor is turned on after receiving the second output signal, and enables the word line driver to be coupled with the word line.

In a second aspect, examples of the present disclosure provide a memory system, which comprises:
- at least one memory device in any one of the foregoing implementations; and
- a memory controller, coupled with the at least one memory device and configured to control the memory device.

In a third aspect, examples of the present disclosure provide an operation method of a memory device. The operation method comprises:
- generating, by a logic circuit in a row decoder of the memory device, a first control signal, a second control signal, and a first output signal based on an address signal and a status signal of a memory block correspondingly connected with the row decoder, wherein a level of the second control signal is higher than a level of the first control signal; and
- generating, by a level conversion circuit in the row decoder, a second output signal based on the first output signal in response to the first control signal and the second control signal respectively.

In an optional implementation, the generating, by the logic circuit in the row decoder of the memory device, the first control signal, the second control signal, and the first output signal based on the address signal and the status signal of the memory block correspondingly connected with the row decoder comprises:
- generating, by a first processing circuit in the logic circuit, a select signal based on the address signal and the status signal of the memory block;
- generating, by a second processing circuit in the logic circuit, the first output signal based on the select signal; and
- generating, by a third processing circuit in the logic circuit, the first control signal and the second control signal based on the select signal.

In an optional implementation, the generating, by a third processing circuit in the logic circuit, the first control signal and the second control signal based on the select signal comprises:
- outputting, by a low level select circuit in the third processing circuit, a first low level to a low level end of a first NAND gate in the third processing circuit in a first period, and outputting a second low level to the low level end of the first NAND gate in a second period; and
- outputting, by the first NAND gate, the first control signal whose level is the first low level based on the select signal and a select enable signal in the first period, and outputting the second control signal whose level is the second low level in the second period.

In an optional implementation, the outputting, by the low level select circuit in the third processing circuit, the first low level to the low level end of the first NAND gate in the third processing circuit in the first period, and outputting the second low level to the low level end of the first NAND gate in the second period comprises:
- applying a first enable signal to a control end of a first transistor in the low level select circuit, and applying a second enable signal to a control end of a second transistor in the low level select circuit, wherein
- in the first period, the first enable signal is a low level signal, the first transistor is turned off, the second enable signal is a high level signal, the second transistor is turned on, and the first low level is outputted to the low level end of the first NAND gate; and
- in the second period, the first enable signal is a high level signal, the first transistor is turned on, the second low level is outputted to the low level end of the first NAND gate, the second enable signal is a low level signal, and the second transistor is turned off.

In an optional implementation, the operation method further comprises:
- generating, by a control logic in the memory device, the select enable signal, the first enable signal, and the second enable signal based on one of a read enable signal, a program enable signal, and a verify enable signal.

In an optional implementation, a range of the first period is 0.5 microseconds to 1 microsecond.

In the technical solution provided in the present disclosure, a row decoder comprises a logic circuit and a level conversion circuit. The logic circuit comprises a low level select circuit, so that the logic circuit may generate a first control signal whose level is a first low level in a first period, and generate a second control signal whose level is a second low level in a second period, and the second low level is higher than the first low level. The level conversion circuit may convert, in response to the first control signal and the second control signal, a first output signal with a low level generated by the logic circuit into a second output signal with a high level. By means of the technical solution provided in the present disclosure, an operation time of a transistor in the level conversion circuit at a large negative bias voltage can be shortened, a degradation degree of electrical performance of a transistor is reduced, and the service life of the level conversion circuit is increased.

The features disclosed in several device examples as provided by the present disclosure may be combined arbitrarily to obtain new device examples in case of no conflicts.

The methods disclosed in several method examples as provided by the present disclosure may be combined arbitrarily to obtain new method examples in case of no conflicts.

The above descriptions are merely example implementations of the present disclosure, and the protection scope of the present disclosure is not limited to these. Any variation or replacement that may be readily figured out by those skilled in this technical field within the technical scope disclosed by the present disclosure shall fall within the protection scope of the present disclosure.

What is claimed is:

1. A memory device, comprising:
   a peripheral circuit comprising at least one row decoder; and
   a memory array coupled with the peripheral circuit and comprising at least one memory block,
   wherein the at least one memory block is correspondingly connected with one row decoder, and the row decoder comprises:
      a logic circuit configured to generate a first control signal, a second control signal, and a first output signal based on an address signal and a status signal of the memory block correspondingly connected with the row decoder, wherein a level of the second control signal is higher than a level of the first control signal; and
      a level conversion circuit configured to generate a second output signal based on the first output signal in response to the first control signal and the second control signal respectively.

2. The memory device of claim 1, wherein the logic circuit comprises a first processing circuit, a second processing circuit, and a third processing circuit, an input end of the second processing circuit and an input end of the third processing circuit are respectively connected with an output end of the first processing circuit, an output end of the second processing circuit is connected with an input end of the level conversion circuit, and an output end of the third processing circuit is connected with a control end of the level conversion circuit, and wherein:
   the first processing circuit is configured to generate a select signal based on the address signal and the status signal of the at least one memory block;
   the second processing circuit is configured to generate the first output signal based on the select signal; and
   the third processing circuit is configured to generate the first control signal and the second control signal based on the select signal.

3. The memory device of claim 2, wherein the third processing circuit comprises a first NAND gate and a low level select circuit connected with a low level end of the first NAND gate, a first input end of the first NAND gate is connected with the output end of the first processing circuit, and a second input end of the first NAND gate is connected with a select enable signal, and wherein:
   the low level select circuit is configured to output a first low level to the low level end of the first NAND gate in a first period, and output a second low level to the low level end of the first NAND gate in a second period; and
   the first NAND gate is configured to output the first control signal, whose level is the first low level, based on the select signal and the select enable signal in the first period, and output the second control signal whose level is the second low level in the second period.

4. The memory device of claim 3, wherein the low level select circuit comprises:
   a first transistor, wherein a first end of the first transistor is connected with the low level end of the first NAND gate, a second end of the first transistor is to receive the second low level, a control end of the first transistor is connected with a first enable signal, and wherein, in the first period, the first enable signal is a low level signal and the first transistor is turned off, and in the second period, the first enable signal is a high level signal and the first transistor is turned on; and
   a second transistor, wherein a second end of the second transistor is connected with the low level end of the first NAND gate and the first end of the first transistor, a first end of the second transistor is to receive the first low level, a control end of the second transistor is connected with a second enable signal, and wherein, in the first period, the second enable signal is the high level signal and the second transistor is turned on, and, in the second period, the second enable signal is the low level signal and the second transistor is turned off.

5. The memory device of claim 4, wherein the peripheral circuit further comprises a control logic configured to
   generate the select enable signal, the first enable signal, and the second enable signal based on one of a read enable signal, a program enable signal, and a verify enable signal.

6. The memory device of claim 2, wherein the level conversion circuit comprises:
   a third transistor, wherein a control end of the third transistor is connected with the output end of the third processing circuit;
   a fourth transistor, wherein a first end of the fourth transistor is connected with a first end of the third transistor, and a second end of the fourth transistor is to receive a first high level; and
   a fifth transistor, wherein a first end of the fifth transistor is connected with the output end of the second processing circuit, a second end of the fifth transistor is connected with a second end of the third transistor, and wherein an end at which the second end of the fifth transistor and the second end of the third transistor are connected with each other is used as an output end of the level conversion circuit and is connected with a control end of the fourth transistor.

7. The memory device of claim 2, wherein the first processing circuit comprises:
   a second NAND gate configured to receive the address signal of the memory block correspondingly connected with the row decoder, and generate a first initial select signal based on the address signal of the memory block;
   a state latch circuit configured to generate a second initial select signal based on the status signal of the memory block; and
   a first NOR gate configured to receive the first initial select signal and the second initial select signal, and generate the select signal based on the first initial select signal and the second initial select signal.

8. The memory device of claim 2, wherein the second processing circuit comprises:
   N phase inverters sequentially connected, wherein an input end of a first phase inverter is connected with the output end of the first processing circuit, and N is an even number greater than zero; and a sixth transistor, wherein a first end of the sixth transistor is connected with an output end of a last phase inverter, and a second end of the sixth transistor is connected with the input end of the level conversion circuit.

9. The memory device of claim 1, wherein the peripheral circuit further comprises:
a word line driver; and
a plurality of driving transistors, wherein first ends of the driving transistors are connected with the word line driver, second ends of the driving transistors are connected with a word line in the memory block, control ends of the driving transistors are connected with an output end of the level conversion circuit, and the driving transistor is turned on after receiving the second output signal and enables the word line driver to be coupled with the word line.

10. A memory system, comprising:
at least one memory device, comprising:
a peripheral circuit comprising at least one row decoder; and
a memory array coupled with the peripheral circuit and comprising at least one memory block,
wherein the at least one memory block is correspondingly connected with one row decoder, and the row decoder comprises:
a logic circuit configured to generate a first control signal, a second control signal, and a first output signal based on an address signal and a status signal of the at least one memory block correspondingly connected with the row decoder, wherein a level of the second control signal is higher than a level of the first control signal; and
a level conversion circuit configured to generate a second output signal based on the first output signal in response to the first control signal and the second control signal respectively; and
a memory controller coupled with the at least one memory device and configured to control the memory device.

11. An operation method of a memory device, comprising:
generating, by a logic circuit in a row decoder of the memory device, a first control signal, a second control signal, and a first output signal based on an address signal and a status signal of a memory block correspondingly connected with the row decoder, wherein a level of the second control signal is higher than a level of the first control signal; and
generating, by a level conversion circuit in the row decoder, a second output signal based on the first output signal in response to the first control signal and the second control signal, respectively.

12. The operation method of the memory device of claim 11, wherein generating, by the logic circuit in the row decoder of the memory device, the first control signal, the second control signal, and the first output signal based on the address signal and the status signal of the memory block correspondingly connected with the row decoder comprises:
generating, by a first processing circuit in the logic circuit, a select signal based on the address signal and the status signal of the memory block;
generating, by a second processing circuit in the logic circuit, the first output signal based on the select signal; and
generating, by a third processing circuit in the logic circuit, the first control signal and the second control signal based on the select signal.

13. The operation method of the memory device of claim 12, wherein generating, by the third processing circuit in the logic circuit, the first control signal and the second control signal based on the select signal comprises:
outputting, by a low level select circuit in the third processing circuit, a first low level to a low level end of a first NAND gate in the third processing circuit in a first period, and outputting a second low level to the low level end of the first NAND gate in a second period; and
outputting, by the first NAND gate, the first control signal whose level is the first low level based on the select signal and a select enable signal in the first period, and outputting the second control signal whose level is the second low level in the second period.

14. The operation method of the memory device of claim 13, wherein outputting, by the low level select circuit in the third processing circuit, the first low level to the low level end of the first NAND gate in the third processing circuit in the first period, and outputting the second low level to the low level end of the first NAND gate in the second period comprises:
applying a first enable signal to a control end of a first transistor in the low level select circuit, and applying a second enable signal to a control end of a second transistor in the low level select circuit,
wherein:
in the first period, the first enable signal is a low level signal, the first transistor is turned off, the second enable signal is a high level signal, the second transistor is turned on, and the first low level is outputted to the low level end of the first NAND gate; and
in the second period, the first enable signal is the high level signal, the first transistor is turned on, the second low level is outputted to the low level end of the first NAND gate, the second enable signal is the low level signal, and the second transistor is turned off.

15. The operation method of the memory device of claim 14, further comprising
generating, by a control logic in the memory device, the select enable signal, the first enable signal, and the second enable signal based on one of a read enable signal, a program enable signal, and a verify enable signal.

16. The operation method of the memory device of claim 13, wherein a range of the first period is 0.5 microsecond to 1 microsecond.

17. The memory system of claim 10, wherein the logic circuit comprises a first processing circuit, a second processing circuit, and a third processing circuit, an input end of the second processing circuit and an input end of the third processing circuit are respectively connected with an output end of the first processing circuit, an output end of the second processing circuit is connected with an input end of the level conversion circuit, and an output end of the third processing circuit is connected with a control end of the level conversion circuit,
wherein:
the first processing circuit is configured to generate a select signal based on the address signal and the status signal of the memory block;
the second processing circuit is configured to generate the first output signal based on the select signal; and
the third processing circuit is configured to generate the first control signal and the second control signal based on the select signal.

18. The memory system of claim 17, wherein the third processing circuit comprises a first NAND gate and a low level select circuit connected with a low level end of the first NAND gate, a first input end of the first NAND gate is connected with the output end of the first processing circuit, and a second input end of the first NAND gate is connected with a select enable signal, wherein:

the low level select circuit is configured to output a first low level to the low level end of the first NAND gate in a first period, and output a second low level to the low level end of the first NAND gate in a second period; and the first NAND gate is configured to output the first control signal whose level is the first low level based on the select signal and the select enable signal in the first period, and output the second control signal whose level is the second low level in the second period.

19. The memory system of claim 18, wherein the low level select circuit comprises:

a first transistor, wherein a first end of the first transistor is connected with the low level end of the first NAND gate, a second end of the first transistor is to receive the second low level, a control end of the first transistor is connected with a first enable signal, and wherein, in the first period, the first enable signal is a low level signal and the first transistor is turned off, and in the second period the first enable signal is a high level signal and the first transistor is turned on; and a second transistor, wherein a second end of the second transistor is connected with the low level end of the first NAND gate and the first end of the first transistor, a first end of the second transistor is to receive the first low level, a control end of the second transistor is connected with a second enable signal, and wherein, in the first period, the second enable signal is the high level signal and the second transistor is turned on, and, in the second period, the second enable signal is the low level signal and the second transistor is turned off.

20. The memory system of claim 19, wherein the peripheral circuit further comprises a control logic configured to generate the select enable signal, the first enable signal, and the second enable signal based on one of a read enable signal, a program enable signal, and a verify enable signal.

* * * * *